US010321526B2

(12) United States Patent
Lin et al.

(10) Patent No.: US 10,321,526 B2
(45) Date of Patent: Jun. 11, 2019

(54) LIGHT EMITTING DIODE DRIVING CIRCUIT FOR REDUCING FLICKER EFFECT

(71) Applicant: EDISON OPTO (DONGGUAN) CO., LTD., Dongguan, Guang Dong (CN)

(72) Inventors: Yu-Chen Lin, Dongguan (CN); Tsung-Heng Lin, Dongguan (CN); Jin-Ping Liu, Dongguan (CN)

(73) Assignee: EDISON OPTO (DONGGUAN) CO., LTD., Dongguan, Guang Dong (CN)

( * ) Notice: Subject to any disclaimer, the term of this patent is extended or adjusted under 35 U.S.C. 154(b) by 225 days.

(21) Appl. No.: 15/475,112

(22) Filed: Mar. 30, 2017

(65) Prior Publication Data

US 2018/0103514 A1    Apr. 12, 2018

(30) Foreign Application Priority Data

Oct. 12, 2016    (CN) .......................... 2016 1 0892398

(51) Int. Cl.
*H05B 33/08*    (2006.01)
*H02J 7/00*    (2006.01)
*H02J 7/04*    (2006.01)
*H02J 7/34*    (2006.01)

(52) U.S. Cl.
CPC ........ *H05B 33/0815* (2013.01); *H02J 7/0063* (2013.01); *H02J 7/04* (2013.01); *H05B 33/0821* (2013.01); *H02J 7/345* (2013.01)

(58) Field of Classification Search
CPC ............. H05B 33/0815; H05B 33/0821; H02J 7/0063; H02J 7/04; H02J 7/345
See application file for complete search history.

(56) References Cited

U.S. PATENT DOCUMENTS

| 2012/0049754 | A1 | 3/2012 | Suzuki |
| 2012/0299489 | A1 | 11/2012 | Sakuragi |
| 2012/0299495 | A1 | 11/2012 | Sakuragi |
| 2014/0239832 | A1 | 8/2014 | Shteynberg |
| 2014/0265907 | A1 | 9/2014 | Su |
| 2015/0002037 | A1* | 1/2015 | Cha ................... H05B 33/0824 315/200 R |

FOREIGN PATENT DOCUMENTS

KR    10-2015-0141158 A    12/2015

\* cited by examiner

*Primary Examiner* — Rexford N Barnie
*Assistant Examiner* — Thai H Tran
(74) *Attorney, Agent, or Firm* — Winston Hsu

(57) ABSTRACT

An LED driving circuit for driving an LED unit includes a power source, a detection circuit, a charging-discharging circuit, and a control circuit. The power source is coupled to the input node of the LED unit. The detection circuit is coupled to the output node of the LED unit, wherein the detection circuit is arranged to generate a detection signal according to an output signal of the LED unit. The charging-discharging circuit includes a resistive circuit, a first diode and an energy storing circuit. When a charging path is enabled, the energy storing circuit is charged by the power source. When a discharging path is enabled, the energy storing circuit is discharged to the LED unit. The control circuit is coupled to the detection circuit, the charging path and the discharging path, for selectively enabling the charging path or the discharging path according to the detection signal.

19 Claims, 3 Drawing Sheets

LIGHT EMITTING DIODE DRIVING CIRCUIT FOR REDUCING FLICKER EFFECT

BACKGROUND OF THE INVENTION

1. Field of the Invention

The present invention relates to a driving circuit, and more particularly, to a light emitting diode (LED) driving circuit which can reduce a flicker effect.

2. Description of the Prior Art

In recent years, environmental awareness and policies designed for environmental protection have increased. For example, many countries have begun to actively promote energy conservation, carbon reduction and other environmental policies, including reducing power consumption of lamps by developing power-saving lighting devices. Amongst these devices, light emitting diode (LED) devices are very popular due to their advantages of energy-saving, environmental protection, long service life and high durability. Hence, LED lighting devices have been applied to a large variety of applications and are gradually replacing traditional lamps.

LEDs are single-direction current driven components; a typical household power supply provides alternating current (AC). AC power sources therefore need to be rectified before they can be used to drive LEDs. Since the brightness of an LED is proportional to the driving current, LEDs are usually connected in series to achieve high and uniform brightness. With a greater number of series-connected light-emitting diodes, the forward bias voltage required for driving the light-emitting diodes will also become higher, resulting in a small operable voltage range. In this situation, when the household power supply is unstable, a flicker effect on the emitted light will be seen. The flicker effect is a phenomenon wherein the intensity of the light non-uniformly changes with time. Regardless of whether it can be observed by the naked eye, it may negatively impact the human body to a certain extent.

Therefore, how to improve LED driving circuits is an important issue in the field.

SUMMARY OF THE INVENTION

To solve the problem mentioned above, the present invention provides a low flicker LED driving circuit, which is capable of compensating a driving current in response to voltage variation of an input power source, in order to reduce the flicker effect occurring in LEDs.

An embodiment of the present invention provides an LED driving circuit for driving an LED unit. The LED unit comprises at least one LED, wherein the LED unit has an input node and an output node. The LED driving circuit comprises a power source, a detection circuit, a charging-discharging circuit, and a control circuit. The power source is coupled to the input node of the LED unit. The detection circuit is coupled to the output node of the LED unit, wherein the detection circuit is arranged to generate a detection signal according to an output signal of the LED unit. The charging-discharging circuit comprises a resistive circuit, a first diode and an energy storing circuit. The resistive circuit has a first node and a second node. The first diode has an anode and a cathode, and the first diode is coupled to the resistive circuit in parallel. The energy storing circuit has a first node and a second node, wherein the first node of the energy storing circuit is coupled to the second node of the resistive circuit and the anode of the first diode. The second node of the energy storing circuit is coupled to the output node of the LED unit. When a charging path is enabled, the first node of the resistive circuit is coupled to the power source, and the energy storing circuit is charged via the power source, the resistive circuit and the charging path. When a discharging path is enabled, the cathode of the first diode is coupled to the LED unit, and the energy storing circuit is discharged via the discharging path, the first diode and the LED unit. The control circuit is coupled to the detection circuit, the charging path and the discharging path, wherein the control circuit is arranged to selectively enable the charging path or enable the discharging path according to the detection signal.

The present invention is arranged to detect the output current of an LED unit via a detection unit, and thereby generate a detection signal for determining whether to provide an additional current to the coupled LED. In this way, when the detection unit detects that the driving current of the LED unit changes, an additional driving current will be provided to the LED unit, thus reducing the flicker effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
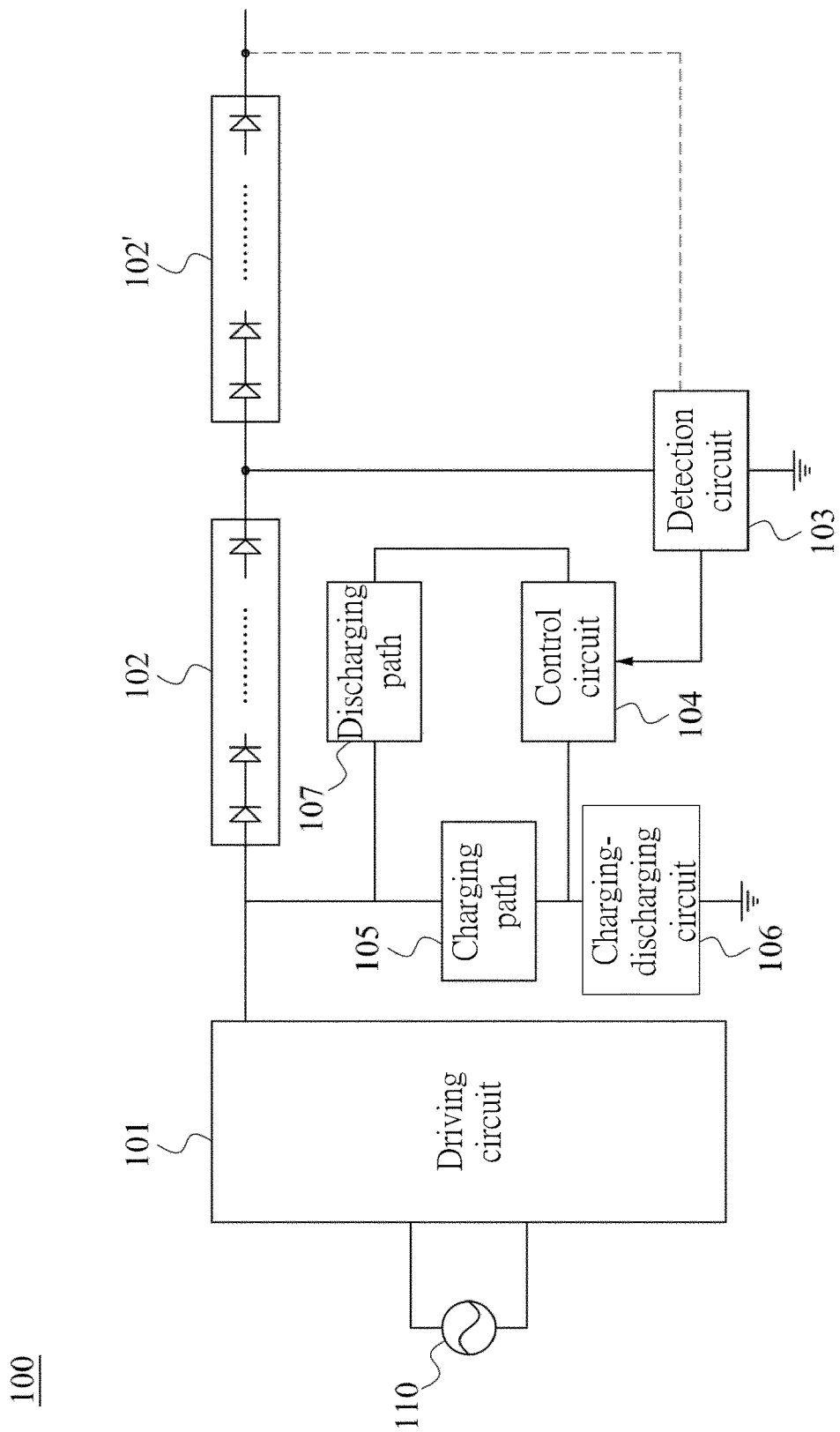
FIG. 1 is a diagram illustrating an LED driving circuit according to an embodiment of the present invention.

Refer to FIG. 1, which is a diagram illustrating an LED driving circuit 100 according to an embodiment of the present invention. As shown in FIG. 1, the LED driving circuit 100 is arranged to drive the LED unit 102, wherein the LED unit 102 may comprise one or more LEDs: more particularly, a plurality of LEDs coupled in series. The LED driving circuit 100 comprises a driving circuit 101, a detection circuit 103, a charging-discharging circuit 106 and a control circuit 104. The driving circuit 101 is coupled to an input node of the LED unit 102, to provide the driving current to the LED 102. In one embodiment, the driving circuit 101 may be a rectifying circuit coupled to an alternating current (AC) power source 110 for rectifying the alternating current transmitted from the AC power source 110, and may provide the LED unit 102 with the rectified current. The detection circuit 103 is coupled to the output node of the LED unit 102 for detecting the output current of the LED unit 102, in order to generate a detection signal corresponding to the output current. In this embodiment, the detection circuit 103 is coupled to the output node of the last LED of the LED unit 102. This is not a limitation of the present invention. In other embodiments, the detection circuit 103 may be coupled to the output node of any LED of the LED unit 102. The charging-discharging circuit 106 is coupled to the output node of the driving circuit 101 via a charging path 105, and/or coupled to the input node of the LED unit 102 via a discharging path 107. The control circuit 104 is coupled to the detection circuit 103, the charging path 105 and the discharging path 107. The control circuit 104 may determine whether to enable the charging path 105 or the discharging path 107 according to the detection signal. In an embodiment, when the control circuit 104 determines to enable the charging path 105 and disable the discharging path 107, the driving circuit 101 may charge the charging-discharging circuit 106 via the charging path 105. When the control circuit 104 enables the discharging path 107 and disables the charging path 105, the charging-discharging circuit 106 will discharge current to the LED unit 102 via the discharging path 107, in order to compensate the driving current.

In an embodiment, the LED driving circuit 100 may be used to drive many LED units 102, each having multiple LEDs connected in series. Further, the detection circuit 103 may be coupled to the output node of any stage LED unit for detecting the output current, and correspondingly compensate the driving current in order to reduce the flicker effect. The detection circuit 103 may be further coupled to the output node of the second stage LED unit 102' for detecting the output current of the second stage LED unit 102', and correspondingly performing compensation upon the driving current. Hence, both the driving currents of the first stage LED unit 102 and the second stage LED unit 102' can be compensated. In addition to coupling to the output node of the driving circuit 101 via the charging path 105, the charging-discharging circuit 106 may be further coupled to the input node of any stage LED unit 102 via the charging path 105, in order to compensate the driving current of a specific stage LED unit in response to the output current detected by the detection circuit 103.

Figure 2:
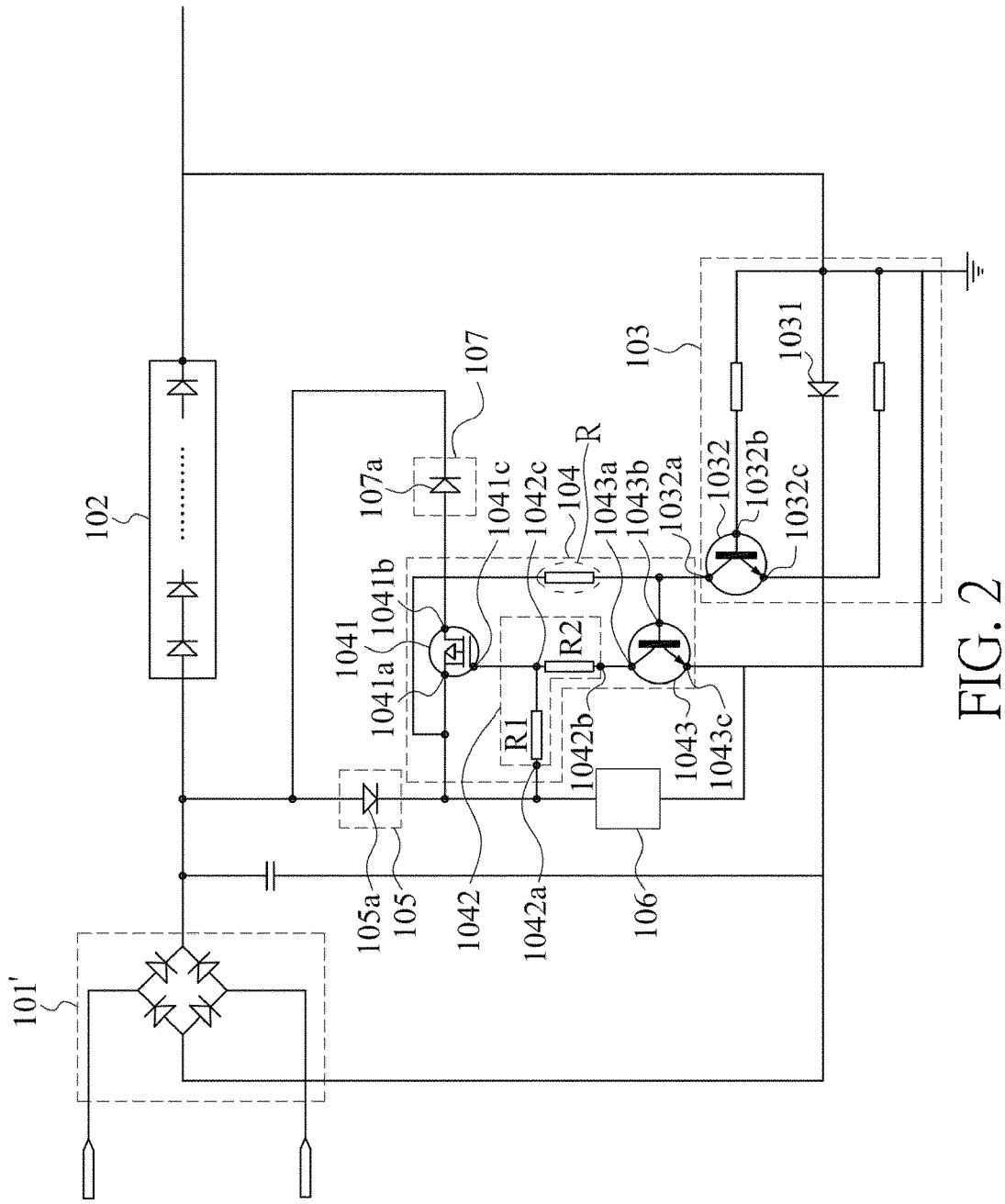
FIG. 2 is a diagram illustrating an LED driving circuit according to another embodiment of the present invention.

FIG. 2 is a diagram illustrating an LED driving circuit according to another embodiment of the present invention. In this embodiment, the driving circuit 101' may be a bridge rectifier. The control circuit 104 comprises a switch 1041, a voltage divider circuit 1042 and a transistor 1043. The switch 1041 has a first node 1041a, a second node 1041b and a control node 1041c. The first node 1041a of the switch 1041 is coupled to the charging path 105, and the second node 1041b of the switch 1041 is coupled to the discharging path 107. The voltage divider circuit 1042 has a first node 1042a, a second node 1042b and a connection node 1042c, wherein the first node 1042a of the voltage divider circuit 1042 is coupled to the charging path 105, and the connection node 1042c is coupled to the control node 1041c of the switch 1041. The transistor 1043 has a first node 1043a, a control node 1043b and a second node 1043c, wherein the first node 1043a of the transistor 1043 is coupled to the second node 1042b of the voltage divider circuit 1042, the control node 1043b of the transistor 1043 is coupled to the detection circuit 103, and the second node 1043c of the transistor 1043 is coupled to the reference potential. For example, the reference potential can be a ground voltage.

In an exemplary embodiment, the transistor 1043 may be an NPN bipolar junction transistor (BJT), and the switch 1041 may be a P-type Metal-Oxide-Semiconductor Field-Effect Transistor. The voltage divider circuit 1042 may have two voltage dividing resistors R1 and R2, which are both coupled to the connection node 1042c. The connection node 1042c is coupled to the control node 1041c of the switch 1041. Since the first node 1042a and the second node 1042b of the voltage divider circuit 1042 are coupled to the driving circuit 101' and the transistor 1043, respectively, different output voltages can be generated at the connection node 1042c to control the conducting state of the switch 1041, e.g. to turn on or turn off the switch 1041.

The charging path 105 further comprises a diode 105a, wherein the anode of the diode 105a is coupled to the output node of the driving circuit 101', and the cathode of the diode 105a is coupled to the charging-discharging circuit 106 and the first node 1041a of the switch 1041. The above configuration of the diode 105a may allow the charging-discharging circuit 106 to be charged by the current in a predetermined direction. The discharging path 107 further comprises a diode 107a, wherein the anode of the diode 107a is coupled to the second node 1041b of the switch 1041, and the cathode of the diode 107a is coupled to the input node of the LED unit 102. With the above configuration of the diode 105a, the charging-discharging circuit 106 may discharge in a predetermined direction. In an embodiment, when the transistor 1043 is turned off, the voltage divider circuit 1042 will generate a high level dividing voltage on the connection node 1042c in response to the output voltage of the driving circuit 101', causing the switch 1041 to turn off. At this moment, the charging path 105 is enabled and the discharging path 107 is disabled, and the driving circuit 101' charges the charging-discharging circuit 106 via the charging path 105. When the transistor 1043 is turned on, the driving circuit 101', via the voltage divider circuit 1042, generates a specific voltage level lower than the voltage level of the driving circuit 101' on the connection node 1042c, causing the switch 1041 to turn on. At this moment, the discharging path 107 is enabled and the charging path 105 is disabled due to the diode 107a. Hence, the charging-discharging circuit 106 will provide an additional current to the LED unit 102 via the discharging path 107, in order to compensate the driving current. In an embodiment, the charging-discharging circuit 106 may be a capacitive component, such as a capacitor.

The detection circuit 103 further comprises a third diode 1031 and a transistor 1032, wherein the transistor 1043 may be an NPN bipolar junction transistor (BJT). The anode of the third diode 1031 is coupled to the output node of the LED unit 102. The transistor 1032 has a first node 1032a, a second node 1032b, and a third node 1032c. The first node 1032a of the transistor 1032 is coupled to the second node 1043b of the transistor 1043. The second node 1032b of the transistor 1032 is coupled to the anode of the third diode 1031, and the third node 1032c of the transistor 1032 is coupled to the cathode of the third diode 1031. In an embodiment, the transistor 1032 may be an NPN bipolar transistor.

With the above configuration, the current at the output node of the LED unit 102 will flow through the third diode 1031, thereby generating a forward bias current. Since the anode of the third diode 1031 is coupled to the second node 1032b of the transistor 1032, and the cathode of the third diode 1031 is coupled to the third node 1032c of the transistor 1032, the forward bias voltage will turn on the transistor 1032, and then a reference voltage level (e.g. the ground voltage level) will occur at the first node 1032a of the transistor 1032. Since the first node 1032a of the transistor 1032 is coupled to the second node 1043b of the transistor 1043, the transistor 1043 will be turned off. At this moment, the output voltage of the driving circuit 101' will occur at the voltage divider circuit 1042, and a high level dividing voltage will occur at the connection node 1042c, thereby turning off the switch 1041. As a result, when the charging path 105 is enabled and the discharging path 107 is disabled, the driving circuit 101' will charge the charging-discharging circuit 106 via the charging path 105. Meanwhile, the charging-discharging circuit 106 will not provide an additional current to the LED unit 102. When the output current at the output node of the LED unit 102 is detected to be large enough, indicating that the LED unit 102 may emit light without flickers, the LED unit 102 may not be further provided with an additional current.

When the current at the output node of the LED unit 102 is detected to be low enough (e.g. there is no current or low current flowing through the third diode 1031), this indicates that the flicker effect may occur in the light emitted by the LED unit 102. In this situation, the transistor 1032 cannot be turned on, and the output voltage of the driving circuit 101' will occur at the second node 1043b of the transistor 1043 via the resistor R, turning the transistor 1043 on. When the transistor 1043 is turned on, the driving circuit 101', via the voltage divider circuit 1042, will generate a specific voltage lower than the voltage of the driving circuit 101' on the connection node 1042c to turn the switch 1041 on. At this moment, the discharging path 107 is enabled and the charging path 105 is disabled due to the diode 107a. Hence, the charging-discharging circuit 106 will provide the LED unit 102 with an additional current via the discharging path 107, in order to compensate the driving current and thereby reduce the flicker effect.

Figure 3:
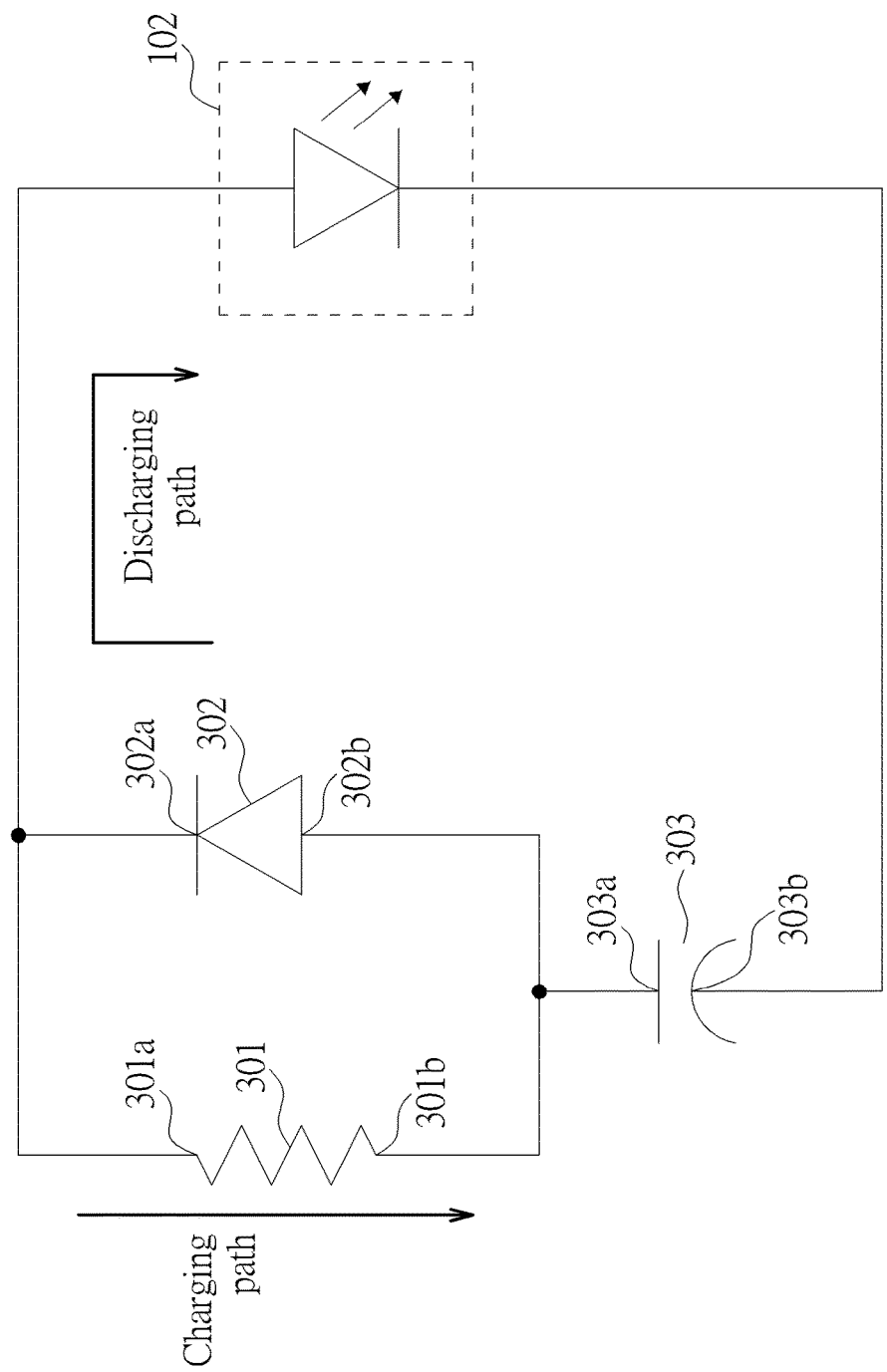
FIG. 3 is a diagram illustrating a charging-discharging circuit shown in FIG. 2 according to an embodiment of the present invention.

Refer to FIG. 3, which is a diagram of the charging-discharging circuit 106 shown in FIG. 2 according to an embodiment of the present invention. As shown in FIG. 3. The charging-discharging circuit 106 comprises a resistive circuit 301, a diode 302 and an energy storing circuit 303. The resistive circuit 301 has a first node 301a and a second node 302b. The diode 302 has an anode 302b and a cathode 302a, wherein the diode 302 is coupled to the resistive circuit 301 in parallel. The energy storing circuit 303 may be a capacitive component or a capacitive circuit, such as a capacitor. This is merely for illustrative purposes, and not a limitation of the present invention. The energy storing circuit 303 has a first node 303a and a second node 303b, wherein the first node 303a of the energy storing circuit 303 is coupled to the second node 301b of the resistive circuit 301 and the anode 302b of the diode 302, and the second node 303b of the energy storing circuit 303 is coupled to the output node of the LED unit. When the charging path (e.g. the charging path 105 illustrated in FIG. 2) is enabled, the first node 301a of the resistive circuit is coupled to a power source (e.g. the power source 110 illustrated in FIG. 1), and the energy storing circuit 303 is charged via the power source, the resistive circuit 301 and the charging path. Further, when the discharging path (e.g. the discharging path 107 illustrated in FIG. 2) is enabled, the cathode 302a of the diode is coupled to the LED unit 102, and the energy storing circuit 303 is discharged via the discharging path, the diode 302 and the LED unit 102.

As detailed in the above, the present invention is arranged to detect the output current of an LED unit and generate a detection signal for determining whether to provide the LED unit with an addition current. In this way, when the driving current of the LED unit is changed, and more particularly reduced, the detection unit is capable of detecting the situation and may compensate the LED unit with an additional driving current in order to reduce the flicker effect.

Those skilled in the art will readily observe that numerous modifications and alterations of the device and method may be made while retaining the teachings of the invention. Accordingly, the above disclosure should be construed as limited only by the metes and bounds of the appended claims. Accordingly, the above disclosure should be construed as limited only by the metes and bounds of the appended claims.

What is claimed is:

1. A light emitting diode (LED) driving circuit for driving an LED unit, the LED unit comprising at least one LED, the LED unit having an input node and an output node, the LED driving circuit comprising:
   a power source, coupled to the input node of the LED unit;
   a detection circuit, coupled to the output node of the LED unit, wherein the detection circuit is arranged to generate a detection signal according to an output signal of the LED unit;
   a charging-discharging circuit, comprising:
      a resistive circuit, having a first node and a second node;
      a first diode, having an anode and a cathode, wherein the first diode is coupled to the resistive circuit in parallel; and
      an energy storing circuit, having a first node and a second node, wherein the first node of the energy storing circuit is coupled to the second node of the resistive circuit and the anode of the first diode; the second node of the energy storing circuit is coupled to the output node of the LED unit; when a charging path is enabled, the first node of the resistive circuit is coupled to the power source, and the energy storing circuit is charged via the power source, the resistive circuit and the charging path; and when a discharging path is enabled, the cathode of the first diode is coupled to the LED unit, and the energy storing circuit is discharged via the discharging path, the first diode and the LED unit;
   a control circuit, coupled to the detection circuit, the charging path and the discharging path, wherein the control circuit is arranged to selectively enable the charging path or enable the discharging path according to the detection signal; and
   a third diode, positioned on the discharging path, wherein an anode of the third diode is coupled to the control circuit, and a cathode of the third diode is coupled to the input node of the LED unit.

2. The LED driving circuit of claim 1, further comprising a second diode positioned on the charging path, wherein an anode of the second diode is coupled to the power source, and a cathode of the second diode is coupled to the charging-discharging circuit and the control circuit.

3. The LED driving circuit of claim 1, wherein the control circuit comprises:
   a switch, having a first node, a second node and a control node, wherein the first node of the switch is coupled to the charging path, and the second node of the switch is coupled to the discharging path;
   a voltage divider circuit, having a first node, a second node and a connection node, wherein the first node of the voltage divider circuit is coupled to the charging path, and the connection node is coupled to the control node of the switch; and
   a first transistor, having a first node, a control node and a second node, wherein the first node of the first transistor is coupled to the second node of the voltage divider circuit, the control node of the first transistor is coupled to the detection circuit, and the second node of the first transistor is coupled to the reference potential.

4. The LED driving circuit of claim 3, wherein the detection circuit further comprises:

a fourth diode having an anode and a cathode, and the anode of the fourth diode is coupled to the output node of the LED unit; and a second transistor having a first node, a control node and a second node, wherein the first node of the second transistor is coupled to the control node of the first transistor, the control node of the second transistor is coupled to the anode of the fourth diode, and the second node of the second transistor is coupled to the cathode of the fourth diode.

5. The LED driving circuit of claim 4, wherein the first transistor and the second transistor are NPN bipolar junction transistors (BJTs), and the switch is a P-type Metal-Oxide-Semiconductor field-effect transistor (MOSFET).

6. The LED driving circuit of claim 1, wherein the energy storing circuit is a capacitive circuit.

7. The LED driving circuit of claim 1, wherein the LED unit comprises a plurality of LEDs coupled in series.

8. The LED driving circuit of claim 7, wherein the detection circuit is coupled to an output node of an LED of the LEDs and generates the detection signal according to an output signal of the LED.

9. The LED driving circuit of claim 7, wherein the energy storing circuit is coupled to an input node of an LED of the LEDs when the discharging path is enabled.

10. The LED driving circuit of claim 1, further comprising:
    a driving circuit coupled between the power source and the LED unit.

11. The LED driving circuit of claim 10, wherein the driving circuit is arranged to rectify an alternating current.

12. A light emitting diode (LED) driving circuit for driving an LED unit, the LED unit comprising at least one LED, the LED unit having an input node and an output node, the LED driving circuit comprising:
    a power source, coupled to the input node of the LED unit;
    a detection circuit, coupled to the output node of the LED unit, wherein the detection circuit is arranged to generate a detection signal according to an output signal of the LED unit;
    a charging-discharging circuit, comprising:
        a resistive circuit, having a first node and a second node;
        a first diode, having an anode and a cathode, wherein the first diode is coupled to the resistive circuit in parallel; and
        an energy storing circuit, having a first node and a second node, wherein the first node of the energy storing circuit is coupled to the second node of the resistive circuit and the anode of the first diode; the second node of the energy storing circuit is coupled to the output node of the LED unit; when a charging path is enabled, the first node of the resistive circuit is coupled to the power source, and the energy storing circuit is charged via the power source, the resistive circuit and the charging path; and when a discharging path is enabled, the cathode of the first diode is coupled to the LED unit, and the energy storing circuit is discharged via the discharging path, the first diode and the LED unit; and
    a control circuit, coupled to the detection circuit, the charging path and the discharging path, wherein the control circuit is arranged to selectively enable the charging path or enable the discharging path according to the detection signal, wherein the control circuit comprises:
        a switch, having a first node, a second node and a control node, wherein the first node of the switch is coupled to the charging path, and the second node of the switch is coupled to the discharging path;
        a voltage divider circuit, having a first node, a second node and a connection node, wherein the first node of the voltage divider circuit is coupled to the charging path, and the connection node is coupled to the control node of the switch; and
        a first transistor, having a first node, a control node and a second node, wherein the first node of the first transistor is coupled to the second node of the voltage divider circuit, the control node of the first transistor is coupled to the detection circuit, and the second node of the first transistor is coupled to the reference potential.

13. The LED driving circuit of claim 12, wherein the detection circuit further comprises:
    a fourth diode having an anode and a cathode, and the anode of the fourth diode is coupled to the output node of the LED unit; and
    a second transistor having a first node, a control node and a second node, wherein the first node of the second transistor is coupled to the control node of the first transistor, the control node of the second transistor is coupled to the anode of the fourth diode, and the second node of the second transistor is coupled to the cathode of the fourth diode.

14. The LED driving circuit of claim 13, wherein the first transistor and the second transistor are NPN bipolar junction transistors (BJTs), and the switch is a P-type Metal-Oxide-Semiconductor field-effect transistor (MOSFET).

15. The LED driving circuit of claim 12, wherein the energy storing circuit is a capacitive circuit.

16. The LED driving circuit of claim 12, wherein the LED unit comprises a plurality of LEDs coupled in series.

17. The LED driving circuit of claim 16, wherein the detection circuit is coupled to an output node of an LED of the LEDs and generates the detection signal according to an output signal of the LED.

18. The LED driving circuit of claim 16, wherein the energy storing circuit is coupled to an input node of an LED of the LEDs when the discharging path is enabled.

19. The LED driving circuit of claim 12, further comprising:
    a driving circuit coupled between the power source and the LED unit.

* * * * *